(12) United States Patent
Suzuki

(10) Patent No.: US 7,793,923 B2
(45) Date of Patent: Sep. 14, 2010

(54) WAVE COIL SPRING

(75) Inventor: Hiroyuki Suzuki, Kanagawa (JP)

(73) Assignee: Piolax, Inc., Yokohama-shi, Kanagawa (JP)

( * ) Notice: Subject to any disclaimer, the term of this patent is extended or adjusted under 35 U.S.C. 154(b) by 604 days.

(21) Appl. No.: 11/730,378

(22) Filed: Mar. 30, 2007

(65) Prior Publication Data

US 2007/0228626 A1 Oct. 4, 2007

(30) Foreign Application Priority Data

Mar. 31, 2006 (JP) .......................... P2006-096347

(51) Int. Cl.
*F16F 1/06* (2006.01)
(52) U.S. Cl. ..................... 267/180; 267/162; 267/166; 267/286
(58) Field of Classification Search .............. 267/162, 267/161, 166, 180, 182, 286
See application file for complete search history.

(56) References Cited

U.S. PATENT DOCUMENTS

| 2,982,323 | A | | 5/1961 | Vossloh et al. | |
|---|---|---|---|---|---|
| 4,901,987 | A | * | 2/1990 | Greenhill et al. | 267/166 |
| 5,622,358 | A | * | 4/1997 | Komura et al. | 267/166 |
| 5,639,074 | A | * | 6/1997 | Greenhill et al. | 267/162 |
| 5,803,444 | A | * | 9/1998 | Shibuya et al. | 267/180 |
| 6,068,250 | A | * | 5/2000 | Hawkins et al. | 267/162 |
| 6,598,406 | B2 | * | 7/2003 | Sylvia | 62/6 |
| 6,669,184 | B2 | * | 12/2003 | Cai et al. | 267/162 |
| 6,758,465 | B1 | * | 7/2004 | Greenhill et al. | 267/166 |
| 7,210,181 | B1 | * | 5/2007 | Price | 5/716 |
| 7,219,447 | B2 | * | 5/2007 | LeVert et al. | 36/27 |
| 7,228,948 | B2 | * | 6/2007 | Wilda et al. | 188/322.15 |

FOREIGN PATENT DOCUMENTS

| EP | 0 795 696 A3 | 3/1999 |
|---|---|---|
| JP | 5-67836 | 3/1993 |
| JP | 2002-174282 | 6/2002 |
| JP | 2002-276706 | 9/2002 |

OTHER PUBLICATIONS

United Kingdom Search Report dated Jul. 30, 2007.
Great Britain Examination Report dated Mar. 12, 2010.

* cited by examiner

*Primary Examiner*—Robert A Siconolfi
*Assistant Examiner*—Mariano Sy
(74) *Attorney, Agent, or Firm*—McGinn IP Law Group, PLLC

(57) ABSTRACT

A wave coil spring includes: a spring main body which has a spiral structure of a wave-shaped spring material, the spring main body bearing an axial compressive load in such a state that surfaces of the spring main body which face each other are brought into contact with each other at a plurality of contact portions, the plurality of contact portions including: a first contact portion where a component of force is produced with application of the compressive load, which attempts to cause the spring main body to slide in a direction in which the coil main body is wound spirally; and a second contact portion where a component of force is produced with application of the compressive load, which attempts to cause the spring main body to slide in a direction in which the spring main body is unwound spirally.

8 Claims, 7 Drawing Sheets

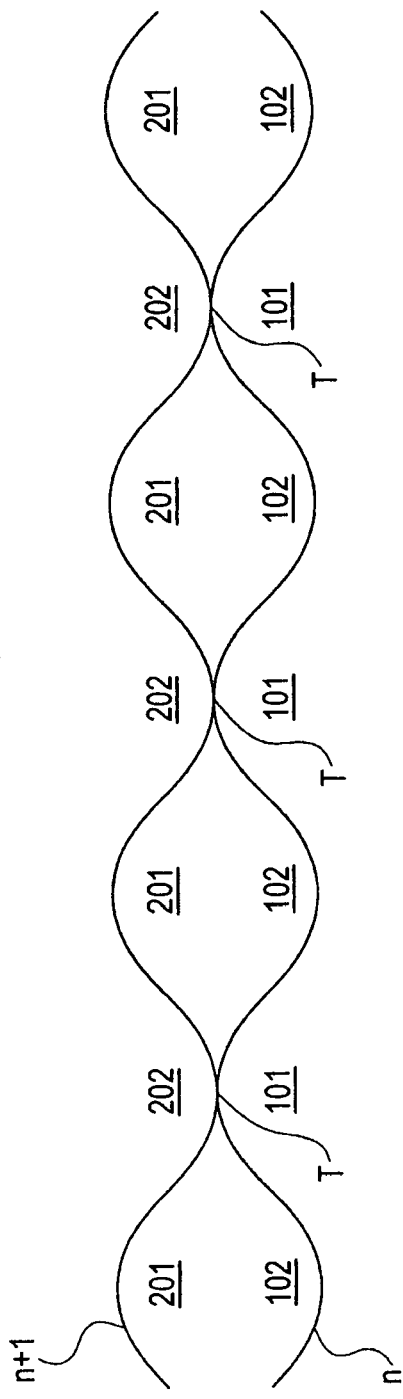
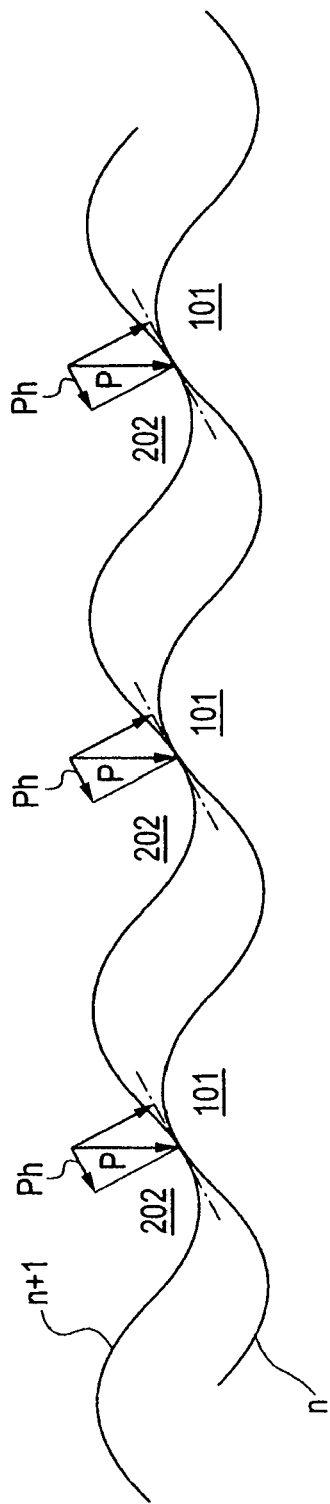
FIG. 7(a) - RELATED ART
FIG. 7(b) - RELATED ART

WAVE COIL SPRING

BACKGROUND OF THE INVENTION

1. Field of the Invention

The present invention relates to a wave coil spring which is installed in, for example, a clutch system of an automatic transmission which is an automotive part.

2. Description of the Related Art

Wave coil springs are made by working a strip of spring material into a wave-like shape and winding the wave-shaped spring material in a spiral fashion and are in general widely used as a return spring for a hydraulic piston incorporated in a clutch system of an automatic transmission or as a damping spring in various types of equipment. As a wave coil spring of this type, there is a wave coil spring which is disclosed in JP-A-2002-174282.

FIGS. 7A and 7B are diagrams which explains a problem inherent in a conventional wave coil spring. The figure exemplarily shows vertically adjacent nth coil and n+1th coil of a wave coil spring which are developed in a straight-line fashion. FIG. 7A shows a state in which no compressive load is applied, whereas FIG. 7B shows a state in which a compressive load is applied to the spring.

As is shown in FIG. 7A, in the wave coil spring, peak portions 101, 201 and valley portions 102, 202 are formed to occur alternately by working a spring material into a wave-like shape, and peak portions 101 of the nth coil (lower coil) and valley portions 202 of the n+1th coil (upper coil) are in contact with or face each other at apex portions T. Then, when a compressive load is applied to the wave coil spring in an axial direction thereof, by nature, the compressive load P is applied to the apex portions T of the peak portions 101 and the valley portions 202, whereby the peak portions and the valley portions 202 deflect and deform uniformly about the apex portions T.

However, in the event that deviations are produced in contact portions between the nth coil and the n+1th coil due to working error or assembling error, or an external force being applied from other directions than the axial direction, as is shown in FIG. 7B, there has occurred a case where the contact portions between the nth coil and the n+1th coil slide in one direction, whereby the compressive load P is applied to middle slopes of the peak portions 101 and the valley portions 202.

In this case, since a tangential component Ph of the compressive load P applied to each of the contact portions is directed to the same direction, when the tangential component Ph becomes larger than a frictional force applied to each of the contact portions, a circumferential slide (buckling) is produced at each of the contact portions, leading to a risk that the load bearing performance of the wave coil spring is reduced drastically.

In order to prevent the occurrence of the slide (buckling) of the contact portion like this, a wave coil spring disclosed in JP-UM-A-5-67836 adopts a configuration in which a locking mechanism made up of a recessed portion and a raised portion is formed at apex portions of (an contact portion between) a peak portion and a valley portion, so as to prevent the slide (buckling) thereof by virtue of engagement of the recessed portion with the raised portion.

In addition, a wave coil spring of JP-A-2002-27670 adopts a configuration in which a damping member is mounted at apex portions of (an contact portion between) a peak portion and a valley portion, so as to fix the contact portion in place to thereby prevent the slide (buckling) thereof.

SUMMARY OF THE INVENTION

In the wave coil spring of JP-UM-A-5-67836, however, the locking mechanism made up of the recessed portion and the raised portion has to be provided at the contact portion, and in the wave coil spring of JP-A-2002-27670, the damping member has to be mounted at the contact portion. These configurations have caused problems of an increased number of working man hours and a complex manufacturing process.

The invention was made in view of these situations, and an object thereof is to provide a wave coil spring which can be manufactured easily and moreover which can prevent the circumferential slide (buckling) so as to maintain a good load bearing performance.

With a view to attaining the object, according to a first aspect of the invention, there is provided a wave coil spring including a spring main body which has a spiral structure of a wave-shaped spring material, the spring main body bearing an axial compressive load in such a state that surfaces of the spring main body which face each other are brought into contact with each other at a plurality of contact portions, the plurality of contact portions including: a first contact portion where a component of force is produced with application of the compressive load, which attempts to cause the spring main body to slide in a direction in which the coil main body is wound spirally; and a second contact portion where a component of force is produced with application of the compressive load, which attempts to cause the spring main body to slide in a direction in which the spring main body is unwound spirally.

Furthermore, according to a second aspect of the invention, there is provided a wave coil spring as set forth in the first aspect of the invention, wherein the first contact portion is a portion where an arbitrary valley portion formed on an n+1th coil (n is a natural number) of the spring main body is brought into contact with one of slopes of an arbitrary peak portion formed on an nth coil of the spring main body, and wherein the second contact portion is a portion where an arbitrary valley portion formed on the n+1th coil of the spring main body is brought into contact with the other slope of the arbitrary peak portion formed on the nth coil of the spring main body.

According to a third aspect of the invention, there is provided a wave coil spring as set forth in the first aspect of the invention, wherein the spring main body is set such that wave-like pitches thereof are made up of long pitches and short pitches which occur alternately and furthermore that a peak portion set on a short pitch is caused to face a valley portion set on a long pitch, while a peak portion set on a long pitch is caused to face a valley portion set on a short pitch.

According to a fourth aspect of the invention, there is provided a wave coil spring as set forth in any of the first to third aspect of the invention, wherein each of the contact portions has a gradient which allows an angle θ formed by a normal of the relevant contact portion relative to a compressive load applied to the spring main body to satisfy the following expression: $\tan \theta > \mu$, where $\mu$ denotes a static friction coefficient of the spring main body.

In the first aspect of the invention, the component of force attempting to slide the spring main body in the direction in which the spring main body is wound spirally which is produced in the first contact portion and the component of force attempting to slide the spring main body in the direction in which the spring main body is unwound spirally which is produced in the second contact portion are caused to cancel each other out, so as to control the circumferential slide (buckling) of the spring main body. Moreover, the wave coil spring of the invention can be manufactured easily by adjusting the positions where the first contact portion and the second contact portions are formed without adding a specific working step.

For example, in the second aspect of the invention, the wave coil spring can easily be manufactured by only adjusting the contact positions of the valley portions on the n+1th coil relative to the peak portions on the nth coil.

In addition, according to the third aspect of the invention, the wave coil spring can easily be manufactured by only adjusting the pitches of the wave-like shapes.

In addition, in the fourth aspect of the invention, although the condition is produced in which the tangential component of force which is produced in each contact portion increases with application of compressive load to facilitate the occurrence of the slide (buckling), since the tangential component of force that is produced in the first contact portion and the tangential component of force that is produced in the second contact portion cancel each other out, the circumferential side (buckling) of the spring main body can be prevented in an ensured fashion even under such a condition.

As has been described heretofore, according to the invention, the wave coil spring can be provided which can easily be manufactured and moreover which can maintain a good load bearing performance while preventing the circumferential slide (buckling) of the spring main body.

BRIEF DESCRIPTION OF THE DRAWINGS

These and other objects and advantages of this invention will become more fully apparent from the following detailed description taken with the accompanying drawings in which:

FIGS. 7A and 7B are diagrams which explains a problem inherent in a conventional wave coil spring.

DETAILED DESCRIPTION OF THE EMBODIMENTS

Hereinafter, an embodiment of the invention will be described in detail by reference to the accompanying drawings.

Figure 1:
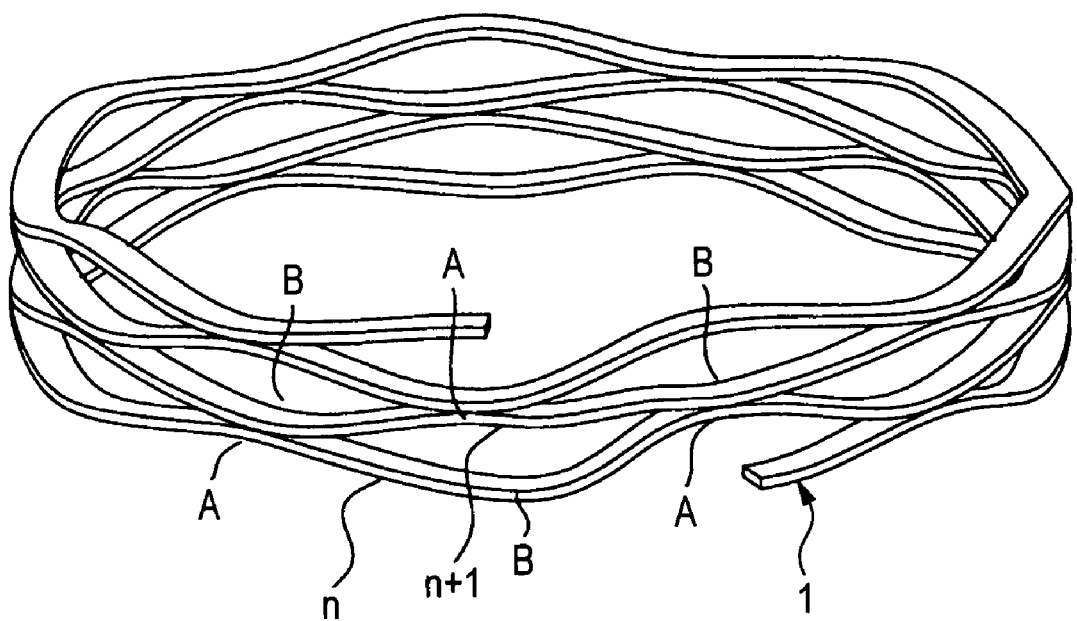
FIG. 1 is a perspective view showing an overall configuration of a wave coil spring of an embodiment of the invention.

FIG. 1 is a perspective view showing an overall configuration of a wave coil spring according to an embodiment.

As is shown in FIG. 1, in a wave coil spring, a spring main body 1 is made by working a strip of spring material into a wave-like shape and winding the wave-shaped spring material in a spiral fashion. This spring main body 1 is such that peak portions A and valley portions B are formed to occur in an alternate fashion by working the spring material into the wave-like shape and is adjusted such that peak portions A on an nth coil (lower coil) face valley portions B on an n+1th coil (upper coil). Note that in this specification, n denotes a natural number.

Figure 2:
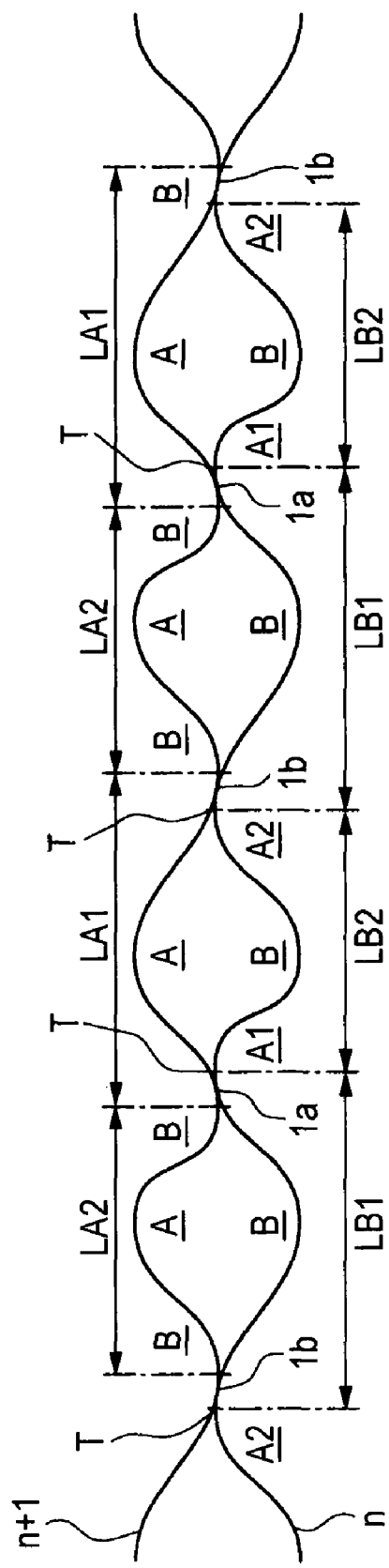
FIG. 2 is a diagram which shows exemplarily a state in which vertically adjacent nth coil and n+1th coil of the wave coil spring of the embodiment are developed in a straight-line fashion.
Figure 3:
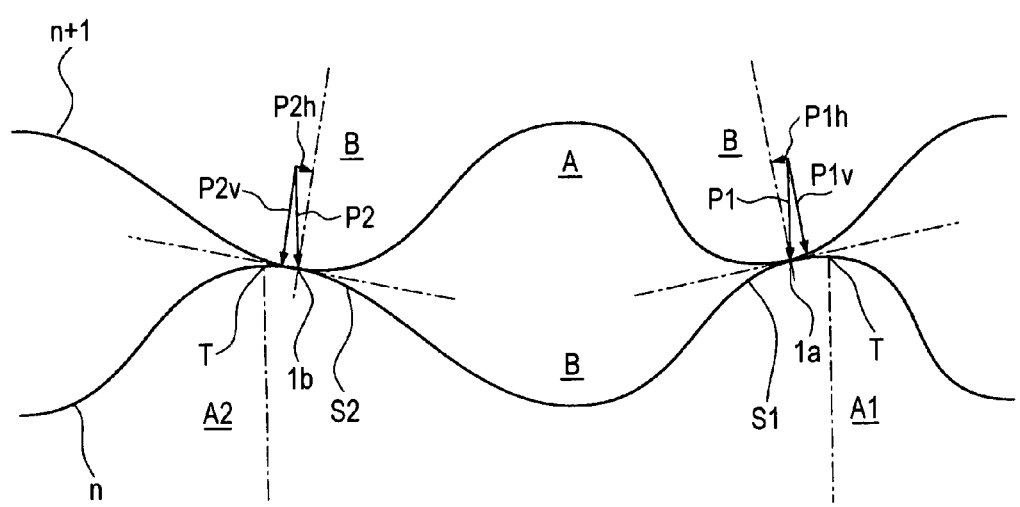
FIG. 3 is a partially enlarged view of the exemplary diagram shown in FIG. 2.

FIG. 2 is a diagram which shows exemplarily a state in which the vertically adjacent nth coil and n+1th coil of the wave coil spring of the embodiment are developed in a straight-line fashion. In addition, FIG. 3 is a partially enlarged view of the exemplary diagram shown in FIG. 2. Note that in these diagrams, a vertical direction denotes an axial direction of the wave coil spring.

As is shown in the enlarged diagram in FIG. 3, in the spring main body 1 which makes up the wave coil spring, at an arbitrary peak portion A1 of the nth coil (lower coil), a valley portion B on the n+1th coil (upper coil) is brought into contact with a slope S1 of the peak portion A1 which lies on one side (left-hand side in the figure) of an apex portion T thereof which functions as a boundary. This contact portion is to be regarded as a first contact portion 1a.

In addition, at another arbitrary peak portion A2 on the nth coil (lower coil), a valley portion B on the n+1th coil (upper coil) is brought into contact with a slope S2 of the peak portion A2 which lies on an opposite side (right-hand side in the figure) to the side at the peak portion A1 of an apex portion T thereof which functions as a boundary. This contact portion is to be regarded as a second contact portion 1b.

In this embodiment, these peak portions A1 and A2 are set to occur sequentially in an alternate fashion, as is shown in FIG. 2. Namely, a configuration is adopted in which first contact portions 1a and second contact portions 1b are provided alternately with each other.

As is shown in FIG. 3, let's assume that an axial (vertical in the figure) compressive load P2 is applied to the second contact portion 1b as soon as an axial (vertical in the figure) compressive load P1 is applied to the first contact portion 1a. The compressive load P applied to the first contact portion 1a can be decomposed into a tangential component P1h and a normal component P1v. Similarly, the compressive load P2 applied to the second contact portion 1b can be decomposed into a tangential component P2h and a normal component P2v.

Here, the tangential components P1h and P2h act to the spring main body 1 in such a manner as to cause a circumferential slide (buckling) thereof. In this embodiment, however, since the tangential component P1h produced in the first contact portion 1a and the tangential component P2h produced in the second contact portion 1b are produced in directions in which the tangential components are offset against each other (cancel each other out), the slide (buckling) of the spring main body 1 is controlled by the offsetting action of the tangential components.

Figure 4:
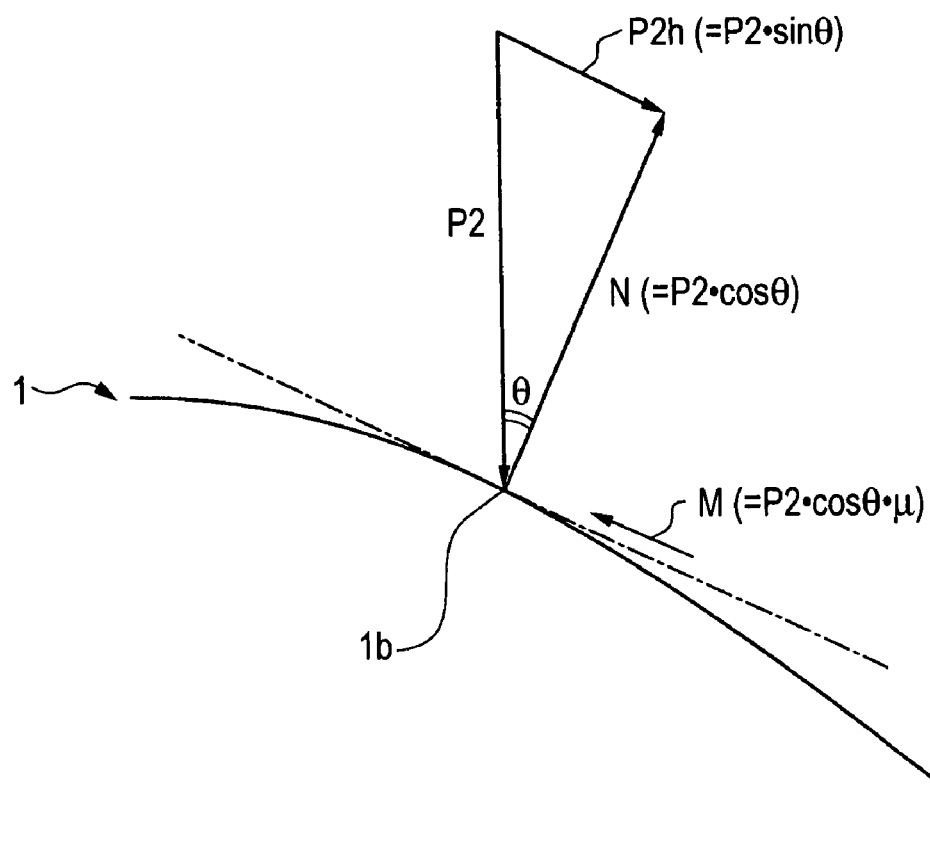
FIG. 4 is a diagram which explains a relationship between a tangential component in a second contact portion and a frictional force produced in the second contact portion.

Here, to describe a relationship between the tangential component P2h in the second contact portion 1b and a frictional force produced in the second contact portion 1b, as is shown in FIG. 4, when the axial compressive load P2 is applied to the second contact portion, a frictional force M applied to the second contact portion 1b becomes a value which results by multiplying a vertical drag $N (=P2*\cos\theta)$ by a static friction coefficient $\mu$. Note that $\theta$ is an angle formed by a normal in the second contact portion 1b and the compressive load P2.

When considering the slide of the spring main body 1 based on only the application of forces to the second contact portion 1b, the spring main body 1 starts to slide when the tangential component $P2h (=P2*\sin\theta)$ becomes larger than the frictional force $(=P2*\cos\theta*\mu)$.

Namely, $P2*\sin\theta > P2*\cos\theta*\mu$

Consequently, in the event that a gradient which satisfies tan θ>μ exists on the slope of the second contact portion 1b, by nature, a slide is produced in the spring main body 1. In this embodiment, however, even though the gradient which satisfies tan θ>μ is imparted to the slope of the second contact portion 1b, since the tangential component Ph1 which is produced in the first contact 1a acts to control the slide of the spring main body 1, the occurrence of a sliding phenomenon is suppressed.

This is true with respect to a relationship between the tangential component Ph1 produced in the first contact portion 1a and a frictional force that is produced in the first contact portion 1a.

The wave coil spring of the embodiment can easily be manufactured through the following steps. Namely, wave-like shapes are firstly formed continuously on a strip of spring material. As this occurs, as is shown in FIG. 2, the formation of wave-like shapes is set such that pitches between valley portions B formed are made up of long pitches LB1 and short pitches LB2 which occur alternately and pitches between peak portions A formed are made up of long pitches LA1 and short pitches LA2 which occur alternately. Next, the spring material is worked to be curved in a spiral fashion and is then cut every time a curved length reaches a predetermined length. In working the spring material to curve it into a spiral shape, a peak portion A set on a short pitch LA2 is made to face a valley portion B set on a long pitch LB1, while a peak portion set on a long pitch LA1 is made to face a valley portion set on a short pitch LB2, whereby as has been described above, a wave coil spring having first contact portions 1a and second contact portions 1b is manufactured (refer to FIGS. 1, 2).

Note that it is sufficient that the first contact portions 1a and the second contact portions 1b are formed only when an axial compressive load is applied to the wave coil spring, and the nth coil (lower coil) and the n+1th coil (upper coil) do not have to be in contact with each other in such a state that no external force is applied to the wave coil spring.

In addition, while in the manufacturing method that has been described just above, the pitches of the peak portions A and the valley portions B are adjusted so that the first contact portions 1a and the second contact portions 1b are formed by alternating the pitch of the peak portion A with the pitch of the valley portion B, in place of or in addition to the adjustment of the pitches, the first contact portions 1a and the second contact portions 1b can be formed by changing the depth (amplitude) between the peak portion A and the valley portion B.

Figure 5:
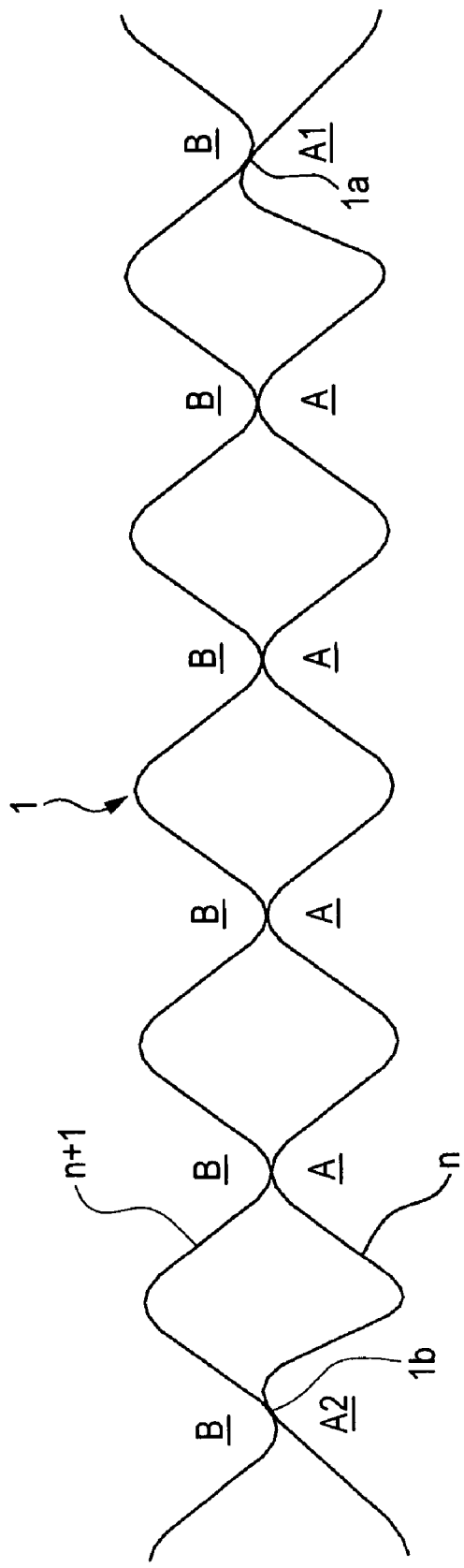
FIG. 5 is a diagram showing a modified example of a wave coil spring of the invention.

Furthermore, while in the embodiment, as is shown in FIG. 2, the first contact portions 1a and the second contact portions 1b are formed alternately and continuously along the peak portions A which are formed continuously, these contact portions 1a, 1b do not have to be formed continuously, and for example, as is shown in FIG. 5, the first contact portion 1a and the second contact 1b can be formed at intervals of a plurality of pitches. As this occurs, although some of contact portions within an area defined by the first contact portion 1a and the second contact portion 1b tend to easily slide, tangential components that are produced in the first contact portions 1a which are formed partially and tangential components that are produced in the second contact portions 1b which are formed partially along the spring main body are offset against each other, so as to suppress the slide of the spring main body 1 as a whole.

Figure 6:
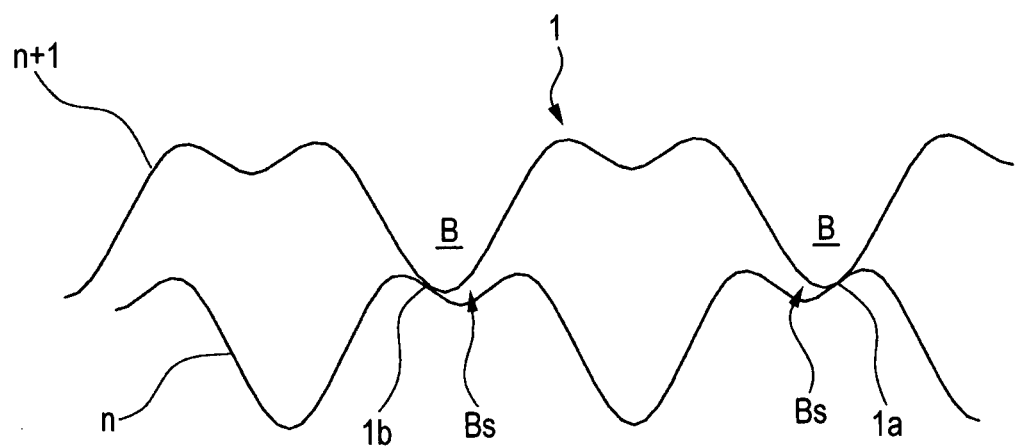
FIG. 6 is a diagram showing the other modified example of a wave coil spring of the invention.

In addition, while in the embodiment, the peak portions A on the nth coil and the valley portions B on the n+1th coil are made to face each other, as is shown in FIG. 6, a shallow valley portion Bs is formed in the peak portion on the nth coil, so that the valley portion B on the n+1th coil can be disposed to face the valley portion Bs so formed. In this case, too, an contact portion between the valley portion Bs and the valley portion B can, needless to say, be made to function as the first contact portion 1a or the second contact portion 1b.

What is claimed is:

1. A wave coil spring comprising:
a spring main body which comprises a spiral structure of a wave-shaped spring material, the spring main body bearing an axial compressive load in such a state that surfaces of the spring main body which face each other are brought into contact with each other at a plurality of contact portions, the plurality of contact portions including:
a first contact portion formed on a slope of the wave-shaped spring material so as to generate a component of force in accordance with application of the compressive load, the component of force attempting to cause the spring main body to slide in a direction in which the spring main body is wound spirally; and
a second contact portion formed on a slope of the wave-shaped spring material so as to generate a component of force in accordance with application of the compressive load, the component of force attempting to cause the spring main body to slide in a direction in which the spring main body is unwound spirally.

2. The wave coil spring according to claim 1, wherein the first contact portion comprises a portion where an arbitrary valley portion formed on an n+1th coil (n is a natural number) of the spring main body is brought into contact with one of slopes of an arbitrary peak portion formed on an nth coil of the spring main body, and
wherein the second contact portion comprises a portion where an arbitrary valley portion formed on the n+1th coil of the spring main body is brought into contact with the other slope of the arbitrary peak portion formed on the nth coil of the spring main body.

3. The wave coil spring according to claim 1, wherein the spring main body is set such that wave-like pitches thereof comprise long pitches and short pitches which occur alternately and furthermore that a peak portion set on a short pitch is caused to face a valley portion set on a long pitch, while a peak portion set on a long pitch is caused to face a valley portion set on a short pitch.

4. The wave coil spring according to claim 1, wherein each of the first contact portion and the second contact portion comprise a gradient which allows an angle θ formed by a normal of the relevant contact portion relative to a compressive load applied to the spring main body to satisfy the following expression:

$$\tan \theta > \mu,$$

where μ denotes a static friction coefficient of the spring main body.

5. The wave coil spring according to claim 1, wherein the first contact portion comprises a plurality of first contact portions and the second contact portion comprises a plurality of second contact portions.

6. The wave coil spring according to claim 1, wherein the first contact portion is formed on a slope prior to, in reference to a clockwise direction of the spring main body following the spiral structure of the wave-shaped spring material, a peak portion formed on the spring main body closest to the first contact portion and the second contact portion is formed on a slope after, in reference to the clockwise direction of the spring main body following the spiral structure of the wave-shaped spring material, a peak portion formed on the spring main body closest to the second contact portion.

7. The wave coil spring according to claim 5, wherein the plurality of contact portions comprise alternating first contact portions and second contact portions.

8. The wave coil spring according to claim 2, wherein a valley is formed in the arbitrary peak portion formed on an nth coil of the spring main body, and wherein the arbitrary valley portion formed on an n+1th coil (n is a natural number) of the spring main body contacts the arbitrary peak portion formed on the nth coil of the spring main body at a portion of the valley formed in the arbitrary peak portion formed on an nth coil of the spring main body.

* * * * *